United States Patent
Wang (10) Patent No.: US 10,826,401 B2
(45) Date of Patent: Nov. 3, 2020

(54) INPUT AC VOLTAGE SENSING FOR FLYBACK CIRCUIT

(71) Applicant: Chengdu Monolithic Power Systems Co. Ltd., Chengdu (CN)

(72) Inventor: Siran Wang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/255,770

(22) Filed: Jan. 23, 2019

(65) Prior Publication Data
US 2019/0238058 A1 Aug. 1, 2019

(30) Foreign Application Priority Data
Jan. 26, 2018 (CN) .......................... 2018 1 0077807

(51) Int. Cl.
*H02M 3/335* (2006.01)
*H02M 1/00* (2006.01)

(52) U.S. Cl.
CPC ... *H02M 3/33523* (2013.01); *H02M 3/33507* (2013.01); *H02M 2001/0009* (2013.01)

(58) Field of Classification Search
CPC .. H02M 1/08; H02M 3/24; H02M 2001/0009; H02M 3/335; H02M 3/33507; H02M 3/33523; H02M 3/33515; H02M 1/32; H02M 1/4258; G01R 19/145; G01R 19/15; G01R 19/155; G01R 19/165; H03K 5/1532

See application file for complete search history.

(56) References Cited

U.S. PATENT DOCUMENTS

| | | | | |
|---|---|---|---|---|
| 4,729,082 A * | 3/1988 | Sato | .................... | H02M 1/4233 363/41 |
| 6,044,000 A * | 3/2000 | Twardzik | ............ | H02M 1/4208 323/222 |
| 8,742,693 B2 * | 6/2014 | Ikeda | ................. | H02M 3/33507 315/307 |
| 8,773,111 B2 * | 7/2014 | Nishikawa | .......... | H02M 1/4225 323/222 |
| 9,431,913 B2 | 8/2016 | Kuang | | |
| 9,729,064 B2 * | 8/2017 | Freeman | ........... | H02M 3/33523 |
| 9,762,131 B1 * | 9/2017 | Wang | ....................... | H02M 1/08 |
| 9,837,917 B1 * | 12/2017 | Furtner | ............. | H02M 3/33523 |
| 10,367,412 B2 * | 7/2019 | Sugimoto | ............... | H02M 1/15 |
| 2010/0123447 A1 * | 5/2010 | Vecera | .................... | H02M 1/32 323/290 |

(Continued)

*Primary Examiner* — Gustavo A Rosario-Benitez
(74) *Attorney, Agent, or Firm* — Perkins Coie LLP (57) ABSTRACT

Input AC voltage sensing for a flyback circuit. The flyback circuit is configured as "primary-high", namely a primary switch of the flyback circuit is positioned "high" to receive an input AC voltage through a first rectifying circuit. A primary winding of the flyback circuit is coupled to a primary ground reference. A voltage sensing circuit has a processing circuit and a first sensing resistor. The processing circuit has a first terminal coupled to the input AC source through a second rectifying circuit, a second terminal coupled to the primary ground reference and an output terminal. The processing circuit subtracts a voltage at the second terminal from a voltage at the first terminal to obtain a differential voltage, which is then sampled and held as an input AC voltage sensing signal.

13 Claims, 3 Drawing Sheets

(56) References Cited

U.S. PATENT DOCUMENTS

| | | | |
|---|---|---|---|
| 2011/0063879 A1* | 3/2011 | Murata | H02M 3/33523 |
| | | | 363/21.13 |
| 2014/0153301 A1* | 6/2014 | Wang | G01R 19/175 |
| | | | 363/52 |
| 2015/0016154 A1* | 1/2015 | Wang | H02M 1/4258 |
| | | | 363/21.12 |
| 2015/0016166 A1* | 1/2015 | Tan | H02M 1/4225 |
| | | | 363/90 |
| 2015/0160287 A1* | 6/2015 | Huang | G01R 31/2836 |
| | | | 324/537 |
| 2016/0072391 A1* | 3/2016 | Sato | H02M 3/33515 |
| | | | 363/21.13 |
| 2017/0025962 A1* | 1/2017 | Davidson | H02M 1/4208 |

* cited by examiner

INPUT AC VOLTAGE SENSING FOR FLYBACK CIRCUIT

CROSS-REFERENCE TO RELATED APPLICATION

This application claims priority to and the benefit of CN patent application No. 201810077807.3, filed on Jan. 26, 2018, which is incorporated herein by reference in its entirety.

TECHNICAL FIELD

The present invention generally relates to electrical circuits, and more particularly but not exclusively relates to voltage sensing in isolation circuit.

BACKGROUND

Figure 1:
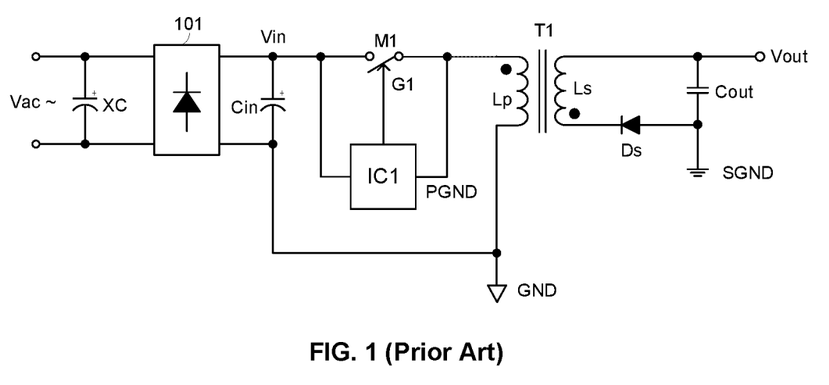
FIG. 1 schematically shows a conventional flyback topology.

FIG. 1 schematically shows a conventional flyback circuit topology referred to as primary-high with secondary-low. As is shown in FIG. 1, a primary switch M1 is coupled in series to a primary winding Lp of a transformer T1 between an input voltage Vin and a primary ground reference GND. It is noted that the primary switch M1 is coupled to the input voltage Vin, while the primary winding Lp of the transformer T1 is coupled to the primary ground reference GND. Namely, in FIG. 1, the position of the primary switch M1 is "high", and such a configuration is referred to as "primary-high". Meanwhile, a secondary switch Ds is coupled in series to a secondary winding Ls of the transformer T1 between an output voltage and a secondary ground reference SGND, wherein the secondary switch Ds is coupled to the secondary ground reference SGND. Namely, the position of the secondary switch Ds is "low", and such a configuration is reference to as "secondary-low". The configuration showed in FIG. 1 is usually adopted for better EMI (Electro Magnetic Interference) performance.

To fulfill functions such as the Brown-in/out, the X-cap discharge and so on, an input AC voltage Vac is sensed by a chip IC1 when the primary switch M1 is turned off. However, for the topology showed in FIG. 1, since the primary switch M1 is positioned between a rectifier bridge 101 and the primary winding Lp of the transformer T1, the input AC voltage Vac is difficult to be sensed when the primary switch M1 is turned off.

Accordingly, it is needed to provide a circuit to sense the input AC voltage and a method thereof in the primary-high flyback topology.

SUMMARY

The present invention is directed to provide a voltage sensing circuit and method thereof, where the input AC voltage is sensed in a primary-high isolating circuit such as a flyback circuit, so that the functions such as Brown-in/out, the X-cap discharge can be fulfilled.

There has been provided, in accordance with an embodiment of the present invention, a voltage sensing circuit for a flyback circuit coupled to an AC source through a first rectifying circuit, wherein the flyback circuit has a primary switch and a primary winding coupled in series between two input terminals of the first rectifying circuit, a connection node of the primary winding and the first rectifying circuit is coupled to a primary ground reference, and a connection node of the primary switch and the primary winding is coupled to a control ground reference, the voltage sensing circuit comprising: a processing circuit, having a first terminal coupled to the AC source through a second rectifying circuit, a second terminal coupled to the primary ground reference and an output terminal, wherein the processing circuit subtracts a voltage at the second terminal of the processing circuit from a voltage at the first terminal of the processing circuit, to obtain a differential voltage, and wherein the differential voltage is sampled and held as an AC voltage sensing signal; and a first sensing resistor, coupled between the second terminal of the processing circuit and the control ground reference.

There has been provided, in accordance with an embodiment of the present invention, a voltage converter comprising: a first rectifying circuit, having a first input terminal, a second input terminal, a first output terminal and a second output terminal, wherein the first input terminal and the second input terminal are coupled to an AC source; a second rectifying circuit, having an first input terminal, a second input terminal and an output terminal, wherein the first input terminal and the second input terminal are coupled to the AC source; an X capacitor, coupled between the first input terminal of the first rectifying circuit and the second input terminal of the first rectifying circuit; a flyback circuit coupled to an AC source through the first rectifying circuit, comprising: a primary switch and a primary winding, coupled in series between two output terminals of the first rectifying circuit, wherein a connection node of the primary winding and the first rectifying circuit is coupled to a primary ground reference, and a connection node of the primary switch and the primary winding is coupled to a control ground reference; a secondary winding, magnetically coupled to the primary winding; a secondary switch, coupled between the first terminal of the secondary winding and a secondary ground reference; and an output capacitor, coupled between the second terminal of the secondary winding and the secondary ground reference; and a voltage sensing circuit for the flyback circuit, comprising: a processing circuit, having a first terminal coupled to the AC source through the second rectifying circuit, a second terminal coupled to the primary ground reference and an output terminal, wherein the processing circuit subtracts a voltage at the second terminal of the processing circuit from a voltage at the first terminal of the processing circuit, to obtain a differential voltage, and wherein the differential voltage is sampled and held as a AC voltage sensing signal; a first sensing resistor, coupled between the second terminal of the processing circuit and the control ground reference.

There has been provided, in accordance with an embodiment of the present invention, a method of sensing an input AC voltage supplied to an isolation circuit in primary-high topology, wherein, the isolation circuit comprises a primary switch and a primary winding coupled in series, and wherein one terminal of the primary winding that is coupled to the primary switch is coupled to a control ground reference, the other terminal of the primary winding is coupled to a primary ground reference, the method comprising: sensing a rectified voltage of the input AC voltage to obtain a first voltage; sensing a voltage across the primary winding to obtain a second voltage; subtracting the second voltage from the first voltage to obtain a differential voltage; and sampling and holding the differential voltage to obtain an AC voltage sensing signal.

BRIEF DESCRIPTION OF THE DRAWINGS

The present invention can be further understood with reference to the following detailed description and the appended drawings, wherein like elements are provided with like reference numerals. The drawings are only for illustration purpose. They may only show part of the devices and are not necessarily drawn to scale.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

In the entire specifications, the reference to the phrases "an embodiment", "the embodiment", "an example", "the example" mean that the specific features, structures and characteristics described in conjunction with this embodiment or example are included in at least one embodiment of the present invention. Consequently, the phrases "an embodiment", "the embodiment", "an example", "the example" in any paragraphs and lines of the entire specifications, are not necessarily indicated to the same embodiments or examples. Furthermore, the specific features, structures and characteristics can be integrated into one or more embodiments or examples through any suitable combination and/or sub-combination. The phrase "connect" or "couple" refers to direct connection or indirect connection via interim media. On the contrary, the phrase "direct connect" or "direct coupling" refers to direct connection without interim media. The same reference label in different drawings indicates the same or like components. The term "and/or" comprise any or the all combinations in one or more concerning listed items.

As FIG. 1 shows, a flyback circuit generally comprises the primary switch M1, the secondary switch Ds and the transformer T1 comprising the primary winding Lp and the secondary winding Ls. The secondary winding Ls is magnetically coupled to the primary winding Lp. The secondary switch Ds is coupled between a first terminal of the secondary winding Ls and the secondary ground reference SGND. An output capacitor Cout is coupled between a second terminal of the secondary winding Ls and the secondary ground reference SGND, and provides an output voltage Vout to post-stage circuit.

Figure 2:
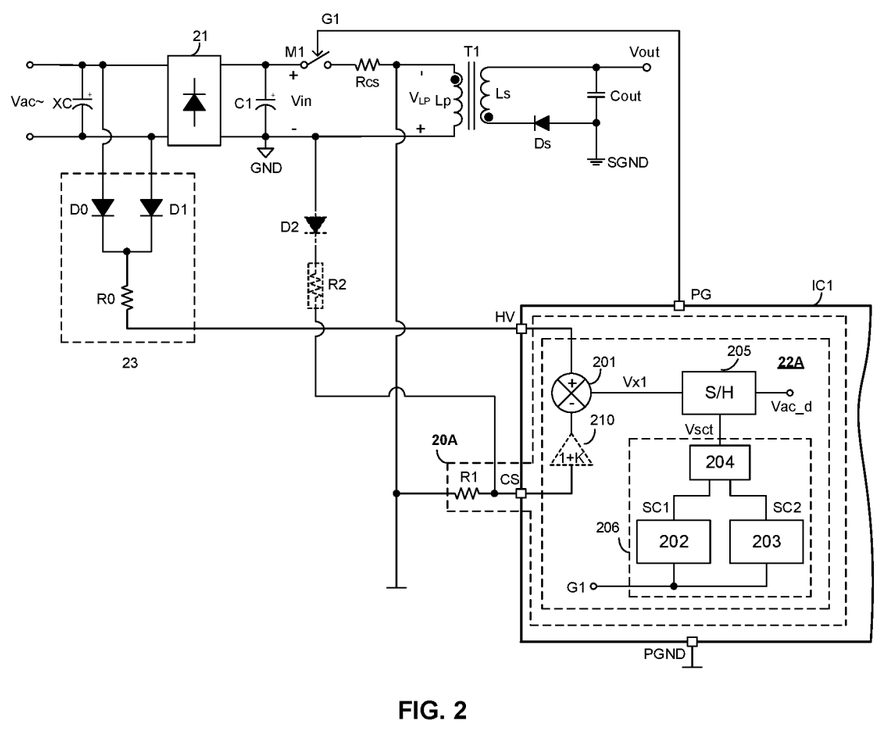
FIG. 2 schematically shows a voltage sensing circuit 20A to sense the input AC voltage Vac of a flyback circuit in accordance with an embodiment of the present invention.

The structure of the primary side in a flyback circuit is shown in FIG. 2. In the example of FIG. 2, the input AC voltage Vac provided by an AC source (not shown here) is rectified by a first rectifying circuit 21 and is filtered by a capacitor C1 to generate an input voltage Vin, which is supplied to the primary switch M1 and the primary winding Lp of the flyback circuit, wherein a first terminal of the primary switch M1 receives the input voltage Vin, a second terminal of the primary switch M1 is coupled to a first terminal of the primary winding Lp, and a second terminal of the primary winding Lp is coupled to the primary ground reference GND. An X capacitor XC is coupled between two input terminals of the first rectifying circuit 21 to suppress differential mode interference.

Meanwhile, FIG. 2 schematically shows a voltage sensing circuit 20A to sense the input AC voltage Vac of the flyback circuit in accordance with an embodiment of the present invention. The voltage sensing circuit 20A comprises a processing circuit 22A and a first sensing resistor R1. As shown in FIG. 2, the processing circuit 22A is integrated in the primary control chip 101. The primary control chip IC1 provides a primary control signal G1 at a pin PG to turn on and off the primary switch M1. For clarity, only the circuits performing voltage sensing are shown in FIG. 2. The processing circuit 22A has a first terminal HV, a second terminal CS and an output terminal, wherein the first terminal HV is coupled to an output terminal of a second rectifying circuit 23, the second terminal CS is coupled to a connection node of the primary switch M1 and the primary winding Lp. In the processing circuit 22A, the voltage at the first terminal HV, i.e. $V_{HV}$, is subtracted by the voltage at the second terminal CS, i.e. Vcs, to obtain an AC current sensing signal Vac_d.

As shown in FIG. 2, two input terminals of the second rectifying circuit 23 receive the input AC voltage Vac, and the output terminal of the second rectifying circuit 23 is coupled to the first terminal HV of the processing circuit 22A. That is to say, the input AC voltage Vac is rectified by the second rectifying circuit 23 and is provided to the processing circuit 22A. In an embodiment of the present invention, the second rectifying circuit 23 has a half-bridge structure comprising switches D0 and D1, and a resistor R0 coupled as shown in FIG. 2.

In an embodiment of the present invention, the flyback circuit further comprises a second sensing resistor R2 apart from the first sensing resistor R1. The first sensing resistor R1 and the second sensing resistor R2 are configured to divide the voltage across the primary winding Lp. The first sensing resistor R1 is coupled between the second terminal CS of the processing circuit 22A and a control ground reference PGND. The control ground reference PGND is a ground reference of the primary control chip 101 and the processing circuit 22A. The second sensing resistor R2 is coupled between the primary ground reference GND and the second terminal CS of the processing circuit 22A. In an embodiment of the present invention, the second resistor R2 is omitted, i.e. the resistance of the second sensing resistor R2 may be zero. In that case, the second terminal CS is directly coupled to the connection node of the first sensing resistor R1 and the primary winding Lp.

In an embodiment of the present invention, the second terminal CS of the processing circuit 22A is an current sensing pin of the primary control chip IC1, and the voltage sensing circuit 22A further comprises a current sensing resistor Rcs coupled in series with the primary switch M1 and the primary winding Lp, wherein one terminal of the resistor Rcs is coupled to the primary switch M1, and the other terminal of the resistor Rcs is coupled to the control ground reference PGND as shown in FIG. 2.

In the example of FIG. 2, the processing circuit 22A comprises an subtracting circuit 201, having a first input terminal coupled to the output terminal of the second rectifying circuit 23, namely the first terminal HV of the processing circuit 22A, a second input terminal coupled to the second terminal CS of the processing circuit 22A, and an output terminal configured to provide a differential voltage Vx1 indicative of the differential between the voltage $V_{HV}$ and the voltage Vcs; a first sample-hold circuit 205, having an input terminal configured to receive the differential voltage Vx1, a control terminal configured to receive a sample control signal Vsct, and an output terminal configured to provide the AC voltage sensing signal Vac_d, wherein when the sample control signal Vsct is valid, the first sample-hold circuit 205 samples and holds the differential voltage Vx1, so as to generate the AC voltage sensing signal Vac_d; and a sample control circuit 206 configured to provide the sample control signal Vsct based on the primary control signal G1, wherein, the primary switch M1 is turned on and off by the primary control signal G1, and the sample control circuit 206 generates a first sample control signal SC1 being valid when a first time delay DT1 elapses after the primary switch is turned off, and generates a second sample control signal SC2 being valid when a second time delay DT2 elapses after the primary switch is turned off, and wherein the sample control signal Vsct is valid when the first sample control signal SC1 or the second sample control signal SC2 is valid. The waveform of the AC voltage sensing signal Vac_d is in line with the waveform of the input AC voltage Vac, and the amplitude of the AC voltage sensing signal Vac_d is in proportion to the amplitude of the input AC voltage Vac.

The valid states of the sample control signal Vsct may be represented in different forms in accordance with different embodiments. For example, in one embodiment, the sample control signal Vsct is valid when the sample control signal Vsct is at high level. In another embodiment, the sample control signal Vsct is valid when the sample control signal Vsct is at rising edge. Similarly, the valid states of the first sample control signal SC1 or the second sample control signal SC2 may be represented in different forms in accordance with different embodiments of the present invention.

Figure 3:
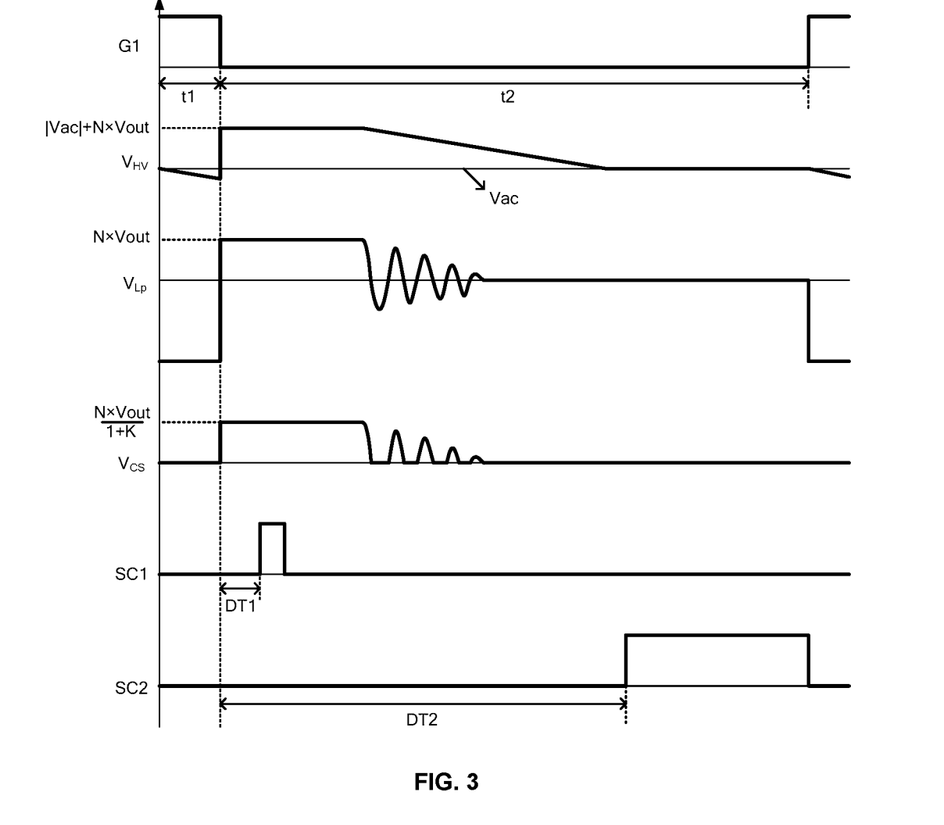
FIG. 3 shows the waveforms of the signals G1, $V_{HV}$, VLP, Vcs, SC1 and SC2 in accordance with an embodiment of the present invention.

FIG. 3 shows the waveforms of the signals G1, $V_{HV}$, $V_{LP}$, Vcs, SC1 and SC2 in accordance with an embodiment of the present invention. The working principle of the processing circuit 22A will be described as follows with the illustration of FIG. 2 and FIG. 3. During a time interval t1, the primary switch M1 is turned on by the primary control signal G1. During a time interval t2, the primary switch M1 is turned off by the primary control signal G1. As a result, the voltage $V_{HV}$ is |Vac|+N×Vout, and the voltage across the primary winding LP, i.e. $V_{LP}$, equals to N×Vout, wherein N is the winding ratio of the transformer T1. Given that K is the resistance ratio of the second resistor R2 to the first resistor R1, the voltage Vcs is N×Vout/(1+K). In the example of FIG. 2, the processing circuit 22A further comprises a multiplying circuit 210, coupled between the second terminal CS of the processing circuit 22A and the subtracting circuit 201. The multiplying circuit 210 multiplies 1+K with the voltage Vcs=N×Vout/(1+K), to get a voltage N×Vo, which is provided to the subtracting circuit 201. In an embodiment of the present invention, the resistance of the first resistor R1 is much larger than that of the second resistor R2. The resistance of the second resistor R2 may be zero in some cases, the voltage Vcs is then approximately N×Vout, meaning that the multiplying circuit 210 may be omitted. The differential voltage Vx1 is obtained by subtracting the voltage Vcs≈N×Vout from the voltage $V_{HV}$. So the differential voltage Vx1 is |Vac|.

In the DCM (Discontinuous Current Mode), when the current flowing through the primary winding Lp decreases to zero, the voltage $V_{LP}$ across the primary winding Lp will oscillate, which means that the voltage Vcs at the second terminal CS of the processing circuit 22A will also oscillate. It's obvious that the differential voltage Vx1 can not reflect the input AC voltage Vac during the oscillation. Accordingly, when the first sample control signal SC1 is valid, e.g. the first sample control signal SC1 is at high level, the differential voltage Vx1 is sampled and held by the first sample-hold circuit 205. The held differential voltage Vx1 is provided as the AC voltage sensing signal Vac_d at the output terminal of the first sample-hold circuit 205. In case that the AC voltage sensing signal Vac_d decreases when the primary switch M1 is kept under off state for too long and the first sample-hold circuit 205 lacks enough accuracy, the differential voltage Vx1 is sampled and held again by the first sample-hold circuit 205 when the second sample control signal SC2 is valid, e.g. the second sample control signal SC2 is at high level, and the AC voltage sensing signal Vac_d at the output terminal of the first sample-hold circuit 205 is updated to the newly held differential voltage Vx1. As FIG. 3 shows, during the time interval when the second sample control signal SC2 is valid, the primary winding Lp has decreased to zero, so the voltage $V_{HV}$ is |Vac| and the voltage Vcs is about zero, which results that the differential voltage Vx1 remains to be |Vac|.

In an embodiment of the present invention, the flyback circuit further comprises a unidirectional device D2, coupled between the primary ground reference GND and the second terminal CS of the processing circuit 22A, namely the unidirectional device D2 is coupled in series with the second resistor R2. The unidirectional device D2 is utilized to block the reverse of the voltage Vcs at the second terminal CS of the processing circuit 22A, and the voltage $V_{AP}$ across the primary winding LP. In an embodiment of the present invention, the unidirectional device D2 comprises a diode having an anode coupled to the primary ground reference GND and a cathode coupled to the second terminal CS of the processing circuit 22A. In other embodiments of the present invention, the unidirectional device D2 may be omitted.

As FIG. 2 shows, the sample control circuit 206 comprises a first sample control circuit 202, a second sample control circuit 203 and a logic circuit 204. The first sample control circuit 202 receives the primary control signal G1, and provides the first sample control signal SC1 based on the primary control signal G1. The second sample control circuit 203 receives the primary control signal G1, and provides the second sample control signal SC2 based on the primary control signal G1. The sample control signal Vsct is obtained as the logic operation result of the first sample control signal SC1 and the second sample control signal SC2 by the logic circuit 204. The logic circuit 204 functions in a way that the logic control signal Vsct is valid when either of the first sample control signal SC1 and the second sample control signal SC2 is valid. In an embodiment of the present invention, the logic circuit 204 comprises an OR gate.

The first sample control circuit 202 receives the primary control signal G1. When the first time delay DT1 elapses after the primary switch M1 is turned off by the primary control signal G1, the first sample control SC1 being valid is provided by the first sample control circuit 202. The first time delay DT1 is to block glitches of the signals generated at the moment the primary switch M1 is turned off. Persons of ordinary skills in the art may reasonably set the first time delay DT1 according to the specified applications. In an embodiment of the present invention, the first time delay is 1 μs.

The second sample control circuit 203 receives the primary control signal G1. When the second time delay DT2 elapses after the primary switch M1 is turned off by the primary control signal G1, the second sample control SC1 being valid is provided by the second sample control circuit 203. The second time delay DT2 is set in a way that the valid second sample control signal SC2 is provided after the oscillation in the voltage Vcs is over. Persons of ordinary skills in the art may reasonably set the second time delay DT2 according to the frequency of the input AC voltage Vac and the specified applications. In an embodiment of the present invention, the second time delay is 500 μs.

Figure 4:
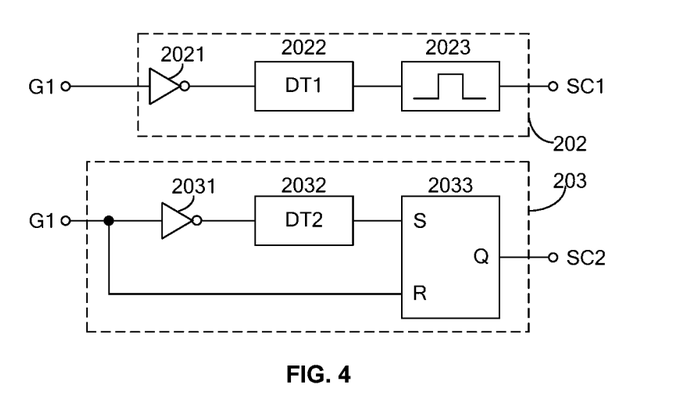
FIG. 4 schematically shows a first sample control circuit 202 and a second sample control circuit 203 in accordance with an embodiment of the present invention.

FIG. 4 schematically shows the first sample control circuit 202 and the second sample control circuit 203 in accordance with an embodiment of the present invention. As shown in FIG. 4, the first sample control circuit 202 comprises an inverting circuit 2021, a delay circuit 2022 and a one shot circuit 2023. The inverting circuit 2021 inverts the primary control signal G1 and provides the corresponding result signal to the delay circuit 2022. The delay circuit 2022 delays the result signal provided by the inverting circuit 2021 for a first time delay DT1 and provides the corresponding result signal to the one shot circuit 2023. The one shot circuit 2023 provides the first sample control signal SC1 at the rising edge of the result signal provided by the delay circuit 2022. It should be understood that the first sample control circuit 202 may be implemented in other forms, as long as the aforementioned functions are fulfilled, the spirit or the substance of the present invention are not distracted. For example, the first sample control signal SC1 may be provided at the falling edge of the delayed primary control signal G1.

As is shown in FIG. 4, the second sample control circuit 203 comprises an inverting circuit 2031, a delay circuit 2032 and a RS latch 2033. The inverting circuit 2031 inverts the primary control signal G1 and provides the corresponding result signal to the delay circuit 2032. The delay circuit 2032 delays the result signal provided by the inverting circuit 2031 for a second time delay DT2 and provides the corresponding result signal to a set terminal "S" of the RS latch 2033, and the primary control signal G1 is provided to a reset terminal "R" of the RS latch 2033. In the example of FIG. 4, the rising edge of the primary control signal G1 resets the RS latch 2033, while the falling edge of the primary control signal G1 sets the RS latch 2033, so the waveform of the second sample control signal SC2 shown in FIG. 3 is then generated.

In an embodiment of the present invention, the second sample control circuit 203 may have the same circuit structure with the second sample control circuit 202, while the first time delay DT1 differs with the second time delay DT2. In this case, the valid state of the second sample control signal SC2 is a rising edge or falling edge of the pulse, which is the same with the first second sample control signal SC1, rather than the high level after the second time delay DT2 shown in FIG. 3.

The circuits shown in FIG. 2 and FIG. 4, and the waveforms of the signals shown in FIG. 3, illustrate the embodiments of the present invention where the valid state of the first sample control signal SC1 is represented by edge and the valid state of the second sample control signal SC2 is represented by voltage level. Persons of ordinary skills in the art should know that, when the valid states of the first sample control signal SC1 and the second sample control signal SC2 are indicated in other different forms, the corresponding circuit structures varies. So, the first sample control circuit 202 and the second sample control circuit 203 are not limited to the embodiments shown in FIG. 2 and FIG. 4. As long as the sample control circuits generate the aforementioned sample control signals to control the sample timing of the first sample-hold circuit 202, the spirit and substance of the present invention are not distracted.

Figure 5:
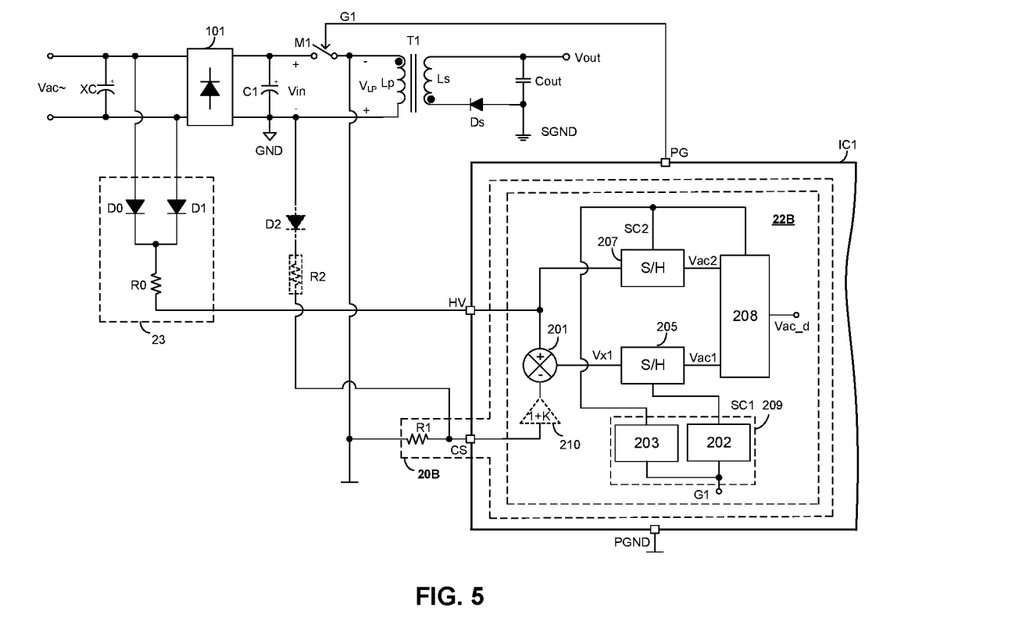
FIG. 5 schematically shows a voltage sensing circuit 20B to sense the input AC voltage Vac of a flyback circuit in accordance with an embodiment of the present invention.

FIG. 5 schematically shows a voltage sensing circuit 20B to sense the input AC voltage Vac of a flyback circuit in accordance with an embodiment of the present invention. The voltage sensing circuit 20B comprises a processing circuit 22B and the first sensing resistor R2. The processing circuit 22B may differ with the processing circuit 22A shown in FIG. 2. As shown in FIG. 5, the processing circuit 22B comprises: the subtracting circuit 201, having the first input terminal coupled to the output terminal of the second rectifying circuit 23, i.e. the first terminal HV of the processing circuit 22B, the second input terminal coupled to the second terminal CS of the processing circuit 22B, and the output terminal configured to provide a differential voltage Vx1, which is the differential between the voltage $V_{HV}$ and the voltage Vcs; the first sample-hold circuit 205, having the input terminal configured to receive the differential voltage X1, the control terminal configured to receive the first sample control signal SC1, the output terminal configured to provide a first AC voltage sensing signal Vac1, wherein, when the first sample control signal SC1 is valid, the first sample-hold circuit 205 samples and holds the differential voltage Vx1, and the differential voltage Vx1 is provided as the first AC voltage sensing signal Vac1; a second sample-hold circuit 207, having an input terminal configured to receive the voltage $V_{HV}$, a control terminal configured to receive the second sample control signal SC2, an output terminal configured to provide a second AC voltage sensing signal Vac2, wherein, when the second sample control signal SC2 is valid, the second sample-hold circuit 207 samples and holds the voltage $V_{HV}$, which is provided as the second AC voltage sensing signal Vac2; a selecting circuit 208, having a first input terminal configured to receive the first AC voltage sensing signal Vac1, a second input terminal configured to receive the second AC voltage sensing signal Vac2, a control terminal configured to receive the second sample control signal SC2, and an output terminal, wherein, when the second sample control signal SC2 is invalid, the output terminal provides the first AC voltage sensing signal Vac1 as the AC voltage sensing signal Vac_d, when the second sample control signal SC2 is valid, the output terminal provides the second AC voltage sensing signal Vac2 as the AC voltage sensing signal Vac_d; and a sample control circuit 209, configured to receive the primary control signal G1 and to provide the first sample control signal SC1 and the second sample control signal SC2 based on the primary control signal G1, wherein, after the primary switch M1 is turned off by the primary control signal G1, the valid first sample control signal SC1 being valid is generated when a first time delay DT1 elapses, and the valid second sample control signal SC2 is generated when a second time delay DT2 elapses.

In an embodiment of the present invention, the processing circuit 22B further comprises the second sensing resistor R2. The first sensing resistor R1 is coupled between the second terminal CS of the processing circuit 22B and the control ground reference PGND. The second sensing resistor R2 is coupled between the primary ground reference GND and the second terminal CS of the processing circuit 22B. Similarly, in some embodiments of the present invention, the second sensing resistor R2 can be omitted, i.e. the resistance of the second sensing resistor R2 may be zero.

In an embodiment of the present invention, the sample control circuit 209 comprises the first sample control circuit 202 and the second sample control circuit 203, which has been described above in detail, and thus will not be described again.

In the example of FIG. 5, when the first sample control signal SC1 is valid, the first sample-hold circuit 205 samples and holds the differential voltage Vx1 to be provided as the first AC voltage sensing signal Vac1 at the output terminal of the first sample-hold circuit 205. when the second sample control signal SC2 is valid, the second sample-hold circuit 207 samples and holds the differential voltage $V_{HV}$ to be provided as the second AC voltage sensing signal Vac2 at the output terminal of the second sample-hold circuit 207. When the second sample control signal SC2 is invalid, the selecting circuit 208 selects the first AC voltage sensing signal Vac1 as the final AC voltage sensing signal Vac_d; when the second sample control signal SC2 is valid, the selecting circuit 208 selects the second AC voltage sensing signal Vac2 as the final AC voltage sensing signal Vac_d. As can be seen from the waveforms of the voltage $V_{HV}$ shown in FIG. 3, when the second sample control signal SC2 is valid, the value of the voltage $V_{HV}$ is equaled with the value of the rectified voltage |Vac|. This means that, when the second sample control signal SC2 is valid, the differential voltage Vx1, the value of which is actually |Vac|, is still provided as the AC voltage sensing signal Vac_d. In case that the AC voltage sensing signal Vac_d decreases since the primary switch M1 is kept under off state for too long and the first sample-hold circuit 205 lacks enough accuracy during the DCM, as the second sample control signal SC2 is valid, the voltage $V_{HV}$ is sampled and held as the second AC voltage sensing signal Vac2 to update the AC voltage sensing signal Vac_d.

The voltage sensing circuit described in the aforementioned embodiments, may be integrated in a chip controlling the primary side, or may be integrated in a standalone chip.

Figure 6:
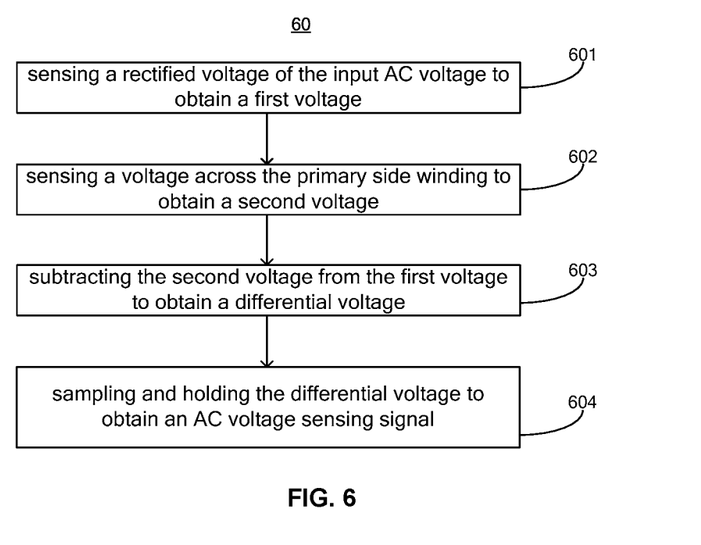
FIG. 6 shows a flow chart of a method of sensing the input AC voltage of a isolation circuit in accordance with an embodiment of the present invention.

FIG. 6 shows a flow chat of a method 60 of sensing the input AC voltage of an isolation circuit in accordance with an embodiment of the present invention. The isolation circuit comprises a circuit comprising a primary side and secondary side, e.g. a flyback circuit, the primary side of which may be as shown in FIG. 2 and FIG. 5. The method 60 comprises: step 601, sensing a rectified voltage of the input AC voltage to obtain a first voltage; step 602, sensing a voltage across the primary winding to obtain a second voltage; step 603, subtracting the second voltage from the first voltage to obtain a differential voltage; and step 604, sampling and holding the differential voltage, to obtain an AC voltage sensing signal indicative of the input AC voltage.

In an embodiment of the present invention, the step 604 comprises: sampling and holding the differential voltage when a first time delay elapses after the primary switch is turned off, and providing the sampled differential voltage as the AC voltage sensing signal; and sampling and holding the differential voltage when a second time delay elapses after the primary switch is turned off, and updating the value of the AC voltage sensing signal to be the newly held differential voltage.

In an embodiment of the present invention, the step 604 comprises: sampling and holding the differential voltage when a first time delay elapses after the primary switch is turned off, and providing the differential voltage as the AC voltage sensing signal; and sampling and holding the first voltage when a second time delay elapses after the primary switch is turned off, and updating the value of the AC voltage sensing signal to be the held first voltage.

While specific embodiments of the present invention have been provided, it is to be understood that these embodiments are for illustration purposes and not limiting. Since the invention can be practiced in various forms without distracting the spirit or the substance of the invention, it should be understood that the above embodiments are not confined to any aforementioned specific detail, but should be explanatory broadly within the spirit and scope limited by the appended claims. Thus, all the variations and modification falling into the scope of the claims and their equivalents should be covered by the appended claims.

What is claimed is:

1. A voltage sensing circuit for a flyback circuit coupled to an AC source through a first rectifying circuit, wherein the flyback circuit has a primary switch and a primary winding coupled in series between two input terminals of the first rectifying circuit, and is configured as a primary-high structure, a first connection node connected to the primary winding and the first rectifying circuit is coupled to a primary ground reference, and a second connection node connected to the primary switch and the primary winding is coupled to a control ground reference, the voltage sensing circuit comprising:
   a processing circuit, having a first terminal coupled to the AC source through a second rectifying circuit, a second terminal coupled to the primary ground reference and an output terminal, wherein, when the primary switch is turned off, the processing circuit subtracts a result of a voltage at the second terminal of the processing circuit multiplied by a proportional coefficient, from a voltage at the first terminal of the processing circuit, to obtain a differential voltage, and wherein the differential voltage is sampled and held as an AC voltage sensing signal; and
   a first sensing resistor, coupled between the second terminal of the processing circuit and the control ground reference;
   wherein, the proportional coefficient is configured such that the result of the voltage at the second terminal of the processing circuit multiplied by the proportional coefficient equals with a voltage across the primary winding when the primary switch is turned off.

2. The voltage sensing circuit of claim 1, wherein the processing circuit comprises:
   a subtracting circuit, having a first input terminal coupled to the first terminal of the processing circuit, a second input terminal coupled to the second terminal of the processing circuit, and an output terminal configured to provide the differential voltage of the voltage at the first terminal of the processing circuit and the result of the voltage at the second terminal of the processing circuit multiplied by the proportional coefficient;
   a first sample-hold circuit, having an input terminal configured to receive the differential voltage, a control terminal configured to receive a sample control signal, and an output terminal configured to provide the AC voltage sensing signal, wherein, when the sample control signal is valid, the first sample-hold circuit samples and holds the differential voltage, so as to generate the AC voltage sensing signal; and a sample control circuit, configured to provide the sample control signal based on a primary control signal, wherein, the primary control signal controls on and off the primary switch, and the sample control circuit generates a first sample control signal being valid when a first time delay elapses after the primary switch is turned off, and generates a second sample control signal being valid when a second time delay elapses after the primary switch is turned off, and wherein the sample control signal is a logic operation result of the first sample control signal and the second sample control signal, and the sample control signal is valid when the first sample control signal or the second sample control signal is valid.

3. The voltage sensing circuit of claim 1, wherein the processing circuit comprises:

a subtracting circuit, having a first input terminal coupled to the first terminal of the processing circuit, a second input terminal coupled to the second terminal of the processing circuit, and an output terminal configured to provide the differential voltage of the voltage at the first terminal of the processing circuit and the result of the voltage at the second terminal of the processing circuit multiplied by the proportional coefficient;

a first sample-hold circuit, having an input terminal configured to receive the differential voltage, a control terminal configured to receive a first sample control signal, and an output terminal configured to provide a first AC voltage sensing signal, wherein, when the first sample control signal is valid, the first sample-hold circuit samples and holds the differential voltage, and the differential voltage is provided as the first AC voltage sensing signal; and a second sample-hold circuit, having an input terminal configured to receive the voltage at the first input terminal of the subtracting circuit, a control terminal configured to receive a second sample control signal, and an output terminal configured to provide a second AC voltage sensing signal, wherein, when the second sample control signal is valid, the second sample-hold circuit samples and holds the voltage received at the input terminal of the second sample-hold circuit, and the held voltage is provided as the second AC voltage sensing signal; and a selecting circuit, having an first input terminal configured to receive the first AC voltage sensing signal, a second input terminal configured to receive the second AC voltage sensing signal, a control terminal configured to receive the second sample control signal, and an output terminal, wherein, when the second sample control signal is invalid, the first AC voltage sensing signal is provided as the AC voltage sensing signal, and when the second sample control signal is valid, the second AC voltage sensing signal is provided as the AC voltage sensing signal; and a sample control circuit, configured to receive a primary control signal that controls the primary switch, and to provide the sample control signal based on the primary control signal, wherein, when a first time delay elapses after the primary switch is turned off by the primary control signal, a first sample control signal being valid is provided by the sample control circuit, and when a second time delay elapses after the primary switch is turned off by the primary control signal, a second sample control signal being valid is provided by the sample control circuit.

4. The voltage sensing circuit of claim 1, further comprising a unidirectional device coupled between the primary ground reference and the second terminal of the processing circuit.

5. The voltage sensing circuit of claim 1, further comprising a second resistor coupled between the primary ground reference and the second terminal of the processing circuit.

6. The voltage sensing circuit of claim 1, further comprising a unidirectional device and a second resistor coupled in series between the primary ground reference and the second terminal of the processing circuit.

7. The voltage sensing circuit of claim 1, further comprising:

a second sensing resistor coupled between the primary ground reference and the second terminal of the processing circuit; and a multiplying circuit coupled between the second terminal of the processing circuit and the second input terminal of the subtracting circuit, the multiplying circuit multiplying the voltage at the second terminal of the processing circuit with a times of 1+K, and providing the result to the subtracting circuit, wherein K is the resistance ratio of the second sensing resistor to the first sensing resistor.

8. The voltage sensing circuit of claim 1, further comprising:

a unidirectional device and a second sensing resistor coupled in series between the primary ground reference and the second terminal of the processing circuit; and a multiplying circuit coupled between the second terminal of the processing circuit and the second input terminal of the subtracting circuit, the multiplying circuit multiplying the voltage at the second terminal of the processing circuit with a times of 1+K, and providing the result to the subtracting circuit, wherein K is the resistance ratio of the second sensing resistor to the first sensing resistor.

9. The voltage sensing circuit of claim 1, wherein the processing circuit is integrated in a primary control chip, and the second terminal of the processing circuit is coupled to a current sensing pin of the primary control chip.

10. A voltage converter, comprising: a first rectifying circuit, having a first input terminal, a second input terminal, a first output terminal and a second output terminal, wherein the first input terminal and the second input terminal are coupled to an AC source; a second rectifying circuit, having an first input terminal, a second input terminal and an output terminal, wherein the first input terminal and the second input terminal are coupled to the AC source; an X capacitor, coupled between the first input terminal of the first rectifying circuit and the second input terminal of the first rectifying circuit; a flyback circuit coupled to the AC source through the first rectifying circuit, comprising: a primary switch and a primary winding configured as a primary-high structure, coupled in series between two output terminals of the first rectifying circuit, wherein a first connection node connected to the primary winding and the first rectifying circuit is coupled to a primary ground reference, and a second connection node connected to the primary switch and the primary winding is coupled to a control ground reference; a secondary winding, magnetically coupled to the primary winding; a secondary switch, coupled between the first terminal of the secondary winding and a secondary ground reference; and an output capacitor, coupled between the second terminal of the secondary winding and the secondary ground reference; and a voltage sensing circuit for the flyback circuit, comprising: a processing circuit, having a first terminal coupled to the AC source through the second rectifying circuit, a second terminal coupled to the primary ground reference and an output terminal, wherein, when the primary switch is turned off, the processing circuit subtracts a result of a voltage at the second terminal of the processing circuit multiplied by a proportional coefficient, from a voltage at the first terminal of the processing circuit, to obtain a differential voltage, and wherein the differential voltage is sampled and held as a AC voltage sensing signal; a first sensing resistor, coupled between the second terminal of the processing circuit and the control ground reference; wherein, the proportional coefficient is configured such that the result of the voltage at the second terminal of the processing circuit multiplied by the proportional coefficient equals with a voltage across the primary winding when the primary switch is turned off.

11. A method of sensing an input AC voltage supplied to an isolation circuit in primary-high topology, wherein, the isolation circuit comprises a primary switch and a primary winding coupled in series and is configured as a primary-high structure, and wherein one terminal of the primary winding that is coupled to the primary switch is coupled to a control ground reference, the other terminal of the primary winding is coupled to a primary ground reference, the method comprising:

sensing a rectified voltage of the input AC voltage to obtain a first voltage;

sensing a voltage across the primary winding to obtain a second voltage;

subtracting a result of the second voltage multiplied by a proportional coefficient, from the first voltage to obtain a differential voltage; and sampling and holding the differential voltage to obtain an AC voltage sensing signal.

12. The method of claim 11, wherein the step of sampling and holding the differential voltage to obtain the AC voltage sensing signal comprises:

sampling and holding the differential voltage when a first time delay elapses after the primary switch is turned off, and providing the held differential voltage as the AC voltage sensing signal; and sampling and holding the differential voltage when a second time delay elapses after the primary switch is turned off, and updating the value of the AC voltage sensing signal to be the newly held differential voltage.

13. The method of claim 11, wherein the step of sampling and holding the differential voltage to obtain the AC voltage sensing signal comprises:

sampling and holding the differential voltage when a first time delay elapses after the primary switch is turned off, and providing the differential voltage as the AC voltage sensing signal; and sampling and holding the first voltage when a second time delay elapses after the primary switch is turned off, and updating the value of the AC voltage sensing signal to be the held first voltage.

* * * * *